(12) United States Patent
Chen (10) Patent No.: US 11,944,992 B2
(45) Date of Patent: Apr. 2, 2024

(54) FOAM MACHINE

(71) Applicant: Dakai Chen, Shantou (CN)

(72) Inventor: Dakai Chen, Shantou (CN)

( * ) Notice: Subject to any disclaimer, the term of this patent is extended or adjusted under 35 U.S.C. 154(b) by 0 days.

(21) Appl. No.: 18/470,465

(22) Filed: Sep. 20, 2023

(65) Prior Publication Data

US 2024/0001380 A1   Jan. 4, 2024

(30) Foreign Application Priority Data

Sep. 6, 2023  (CN) .......................... 202322427321.7

(51) Int. Cl.
| | |
|---|---|
| *B05B 7/00* | (2006.01) |
| *A62C 5/02* | (2006.01) |
| *A62C 31/12* | (2006.01) |
| *B01F 23/235* | (2022.01) |
| *B01F 25/31* | (2022.01) |
| *B05B 3/02* | (2006.01) |
| *B32B 38/00* | (2006.01) |

(52) U.S. Cl.
CPC ............ *B05B 7/0062* (2013.01); *A62C 5/022* (2013.01); *B01F 23/235* (2022.01); *B01F 25/3111* (2022.01); *A62C 31/12* (2013.01); *B05B 3/02* (2013.01); *B32B 2038/0084* (2013.01)

(58) Field of Classification Search
CPC ....... B05B 7/0037; B05B 7/0062; B05B 3/02; B05B 7/0018; B05B 7/0031; B05B 7/0043; B05B 7/005; B05B 7/0056; B01F 25/235; B01F 25/3111; A62C 5/022; A62C 5/02; A62C 31/12; F05D 2210/13; F04D 29/563; F04D 29/542; F04D 25/10; F04D 19/002; F04D 19/007; F04D 29/703; F04D 29/705; F04D 29/708; F04D 29/548; F04D 13/06; F04D 25/06; F04D 25/0606
USPC ........................................................ 239/343
See application file for complete search history.

(56) References Cited

U.S. PATENT DOCUMENTS

| | | | | | |
|---|---|---|---|---|---|
| 2,769,500 | A | * | 11/1956 | Clifford ................. | A62C 5/002 417/381 |
| 3,241,617 | A | * | 3/1966 | Jamison ............... | A62C 3/0207 261/DIG. 26 |
| 3,512,761 | A | * | 5/1970 | Lundberg ........... | A62C 99/0027 261/DIG. 26 |

(Continued)

FOREIGN PATENT DOCUMENTS

CN    107866337 A * 4/2018 ............... B05B 1/02

*Primary Examiner* — Joseph A Greenlund
*Assistant Examiner* — Kevin Edward Schwartz
(74) *Attorney, Agent, or Firm* — Zhigang Ma (57) ABSTRACT

The present disclosure relates to a foam machine. Liquid for generating foams is conveyed onto a laminating member through a liquid pump. The laminating member further conveys the liquid onto a foam forming device. On the foam forming device, a rotating ring is provided with a plurality of forming rings and a plurality of forming ribs, so that a plurality of foam film forming holes are formed in the rotating ring; afterwards, as the rotating ring rotates, the laminating member can form foam films on the respective foam film forming holes, and continuous foams are formed after an air flow is blown through; the foams are pushed by the air flow to be continuously sprayed out; and new foam films are continuously formed on the respective foam film forming holes.

10 Claims, 8 Drawing Sheets

(56) References Cited

U.S. PATENT DOCUMENTS

| | | | | |
|---|---|---|---|---|
| 4,482,347 | A | * | 11/1984 | Borsanyi .......... A61M 5/14244 |
| | | | | 417/474 |
| 4,653,591 | A | * | 3/1987 | Marshall .................. A62C 5/02 |
| | | | | 169/44 |
| 6,213,718 | B1 | * | 4/2001 | Hill ....................... F04D 29/703 |
| | | | | 416/247 R |
| 6,688,402 | B1 | * | 2/2004 | Wise ........................ B64D 1/22 |
| | | | | 169/44 |
| 2012/0228332 | A1 | | 9/2012 | Huang |
| 2016/0175858 | A1 | * | 6/2016 | Bell ........................ B05B 15/74 |
| | | | | 239/206 |
| 2017/0306985 | A1 | * | 10/2017 | Strehle .................. F04D 29/541 |
| 2019/0159636 | A1 | | 5/2019 | Lo |
| 2021/0086204 | A1 | * | 3/2021 | Giannazzo ................ B05B 1/04 |
| 2021/0113873 | A1 | * | 4/2021 | Villeneuve ........... A62C 3/0292 |
| 2022/0032511 | A1 | | 2/2022 | Condon et al. |
| 2022/0289150 | A1 | * | 9/2022 | Enow ................... B05B 12/002 |

\* cited by examiner

FOAM MACHINE

TECHNICAL FIELD

The present disclosure relates to the field of foam machines, and in particular, to a foam machine.

BACKGROUND

A foam machine is a set of equipment configured to produce foam films. The equipment will continuously produce foams during working and is widely used in scenes or places such as fire fighting, cleaning, water treatment, and entertainment. Specifically, foams in the field of fire fighting are sprayed to a fire to extinguish the fire. For the purpose of cleaning, foams are used to complete the cleaning. In a water cleaning process, foams are used to be attached to pollutants to achieve purification. For the purpose of entertainment, foams are used to create an atmosphere.

However, the foam machine in the related art usually needs to be provided with a mixing chamber, in which gas and liquid need to be fully mixed to form foams. The foams are then driven and sprayed out through an injection mechanism. On the one hand, arranging the mixing chamber and the injection mechanism causes an overall volume of the foam machine to be larger, so that the overall compactness of a product is poor, and on the other hand, the production cost of the product is extremely high.

SUMMARY

The technical problem to be solved in the present disclosure is to provide a foam machine, which can improve the overall compactness of a product and can also reduce the production cost of the product.

The present disclosure provides a foam machine, including a shell, a driving motor arranged on the shell, fan blades in driving connection to the driving motor, a foam forming device movably arranged on the shell, and a laminating device arranged on the shell, wherein the foam forming device includes a rotating ring rotatably arranged on the shell, a number of forming ring arranged on the rotating ring, and a number of forming ribs arranged on the rotating ring; centers of the forming rings all correspond to a center of the rotating ring, and radiuses of the forming rings gradually increase; the forming ribs are intersected with the forming rings, so that the forming ribs and the forming rings jointly define a number of foam film forming holes on the rotating ring;

the laminating device includes a liquid pump arranged on the shell, and a laminating member arranged on the shell; the laminating member resists against the forming rings and the forming ribs; the laminating member is provided with a liquid inlet hole communicated with the liquid pump and a liquid outlet hole facing to the foam forming device; the liquid inlet hole is configured to introduce liquid; the liquid inlet hole is communicated with the liquid outlet hole;

when the rotating ring rotates, the liquid is exported through the liquid outlet hole to the foam film forming holes, thereby forming foam films on the foam film forming holes; and when the fan blades rotate, an air flow is driven to pass through the foam film forming holes to generate foams.

Preferably, the forming rings are each provided with a number of auxiliary rings; the foam film forming holes each expose the auxiliary rings; and a liquid storage gap is defined between two adjacent auxiliary rings.

Preferably, an outer diameter of the rotating ring is 65 mm to 95 mm; and/or the foam forming device includes at least eight forming rings; and/or the foam forming device includes at least fourteen forming ribs, and the forming ribs are circumferentially distributed around the center of the rotating ring.

Preferably, the centers of the forming rings overlap each other, and a space between any two adjacent forming rings is equal in size.

Preferably, the foam forming device further includes a number of spacing groups; one spacing group is arranged between every two adjacent forming ribs, and each spacing group includes two first ribs spaced part from each other and a second rib located between the two first ribs; and the first ribs, the second ribs, the forming ribs, and the forming rings jointly define the several foam film forming holes on the rotating ring.

Preferably, the laminating device further includes a number of flow distribution plates arranged on the laminating member; an air guide channel is arranged between any two adjacent flow distribution plates; and the air guide channels guide the air flow to be blown to the laminating member.

Preferably, the laminating member is provided with a number of the liquid inlet holes and a number of the liquid outlet holes; and the liquid inlet holes are all communicated with at least two of the liquid outlet holes.

Preferably, the laminating member is provided with two liquid inlet holes and four liquid outlet holes; and the liquid inlet holes are all communicated with the two liquid outlet holes.

Preferably, the foam forming device further includes a tooth ring arranged on the rotating ring and a transmission rod arranged on the shell;

two ends of the transmission rod are provided with gears; one end of the transmission rod is engaged with the tooth ring; and the other end of the transmission rod is engaged with the driving motor.

Preferably, the liquid pump includes a pump case arranged on the shell, a rotating disk in driving connection to the driving motor, a convex column arranged on the rotating disk, and an infusion tube arranged in the pump case;

the pump case defines an infusion channel on the shell; the infusion tube is located inside the infusion channel; the infusion tube is communicated with the liquid inlet holes;

the convex column resists against the infusion tube in a sliding manner; and the rotating disk drives the convex column to move along the infusion channel, so that the infusion tube guides the liquid to the liquid inlet holes.

Implementation of the present disclosure has the following beneficial effects:

The present disclosure relates to a foam machine. Liquid for generating foams is conveyed onto a laminating member through a liquid pump. The laminating member further conveys the liquid onto a foam forming device. On the foam forming device, a rotating ring is provided with a plurality of forming rings and a plurality of forming ribs, so that a plurality of foam film forming holes are formed in the rotating ring; afterwards, as the rotating ring rotates, the laminating member can form foam films on the foam film forming holes, and continuous foams are formed after an air flow is blown through; the foams are pushed by the air flow to be continuously sprayed out; and new foam films are continuously formed on the foam film forming holes.

Therefore, the arrangement of a mixing chamber and an air pump injection mechanism is avoided, which improves the overall compactness of a product and also reduces the production cost of the product.

BRIEF DESCRIPTION OF THE DRAWINGS

The above and other purposes, features and advantages of the present disclosure will become more apparent through a more detailed description of the exemplary embodiments of the present disclosure in combination with the accompanying drawings. In the exemplary embodiments of the present disclosure, the same reference numerals usually represent the same components.

DETAILED DESCRIPTION OF THE EMBODIMENTS

Implementations of the present disclosure will be described in more detail below with reference to the accompanying drawings. Although the implementations of the present disclosure are shown in the drawings, it should be understood that the present disclosure can be implemented in various forms and should not be limited by the implementations set forth herein. On the contrary, these implementations are provided to enable a more thorough and complete understanding of the present disclosure and to fully deliver the scope of the present disclosure to those skilled in the art.

It should be understood that although the terms "first", "second", "third", etc. may be used to describe various kinds of information in the present disclosure, the information should not be limited to these terms. These terms are only used to distinguish the same type of information from each other. For example, the first information can also be referred to as the second information without departing from the scope of the present disclosure. Similarly, the second information can also be referred to as the first information. Therefore, features defined by "first" and "second" can explicitly instruct or impliedly include one or more features. In the description of the present disclosure, unless expressly specified otherwise, the meaning of the "plurality" is two or more than two.

In the description of the present disclosure, it should be understood that orientations or positional relationships indicated by the terms "length", "width", "upper", "lower", "front", "rear", "left", "right", "vertical", "horizontal", "top", "bottom", "inside", "outside" and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are not construed as limiting the present disclosure.

Unless otherwise clearly specified and defined, the terms "mounted", "connected", "coupled", "fixed", and the like should be understood in a broad sense, for example, it can be a fixed connection, a detachable connection, or integrated. It can be a mechanical connection or an electrical connection. It can be a direct connection, or an indirect connection through an intermediate medium. It can also be an internal connection between two components or the interaction between two components. Those of ordinary skill in the art can understand the specific meanings of the above terms in the present disclosure according to specific situations.

Figure 1:
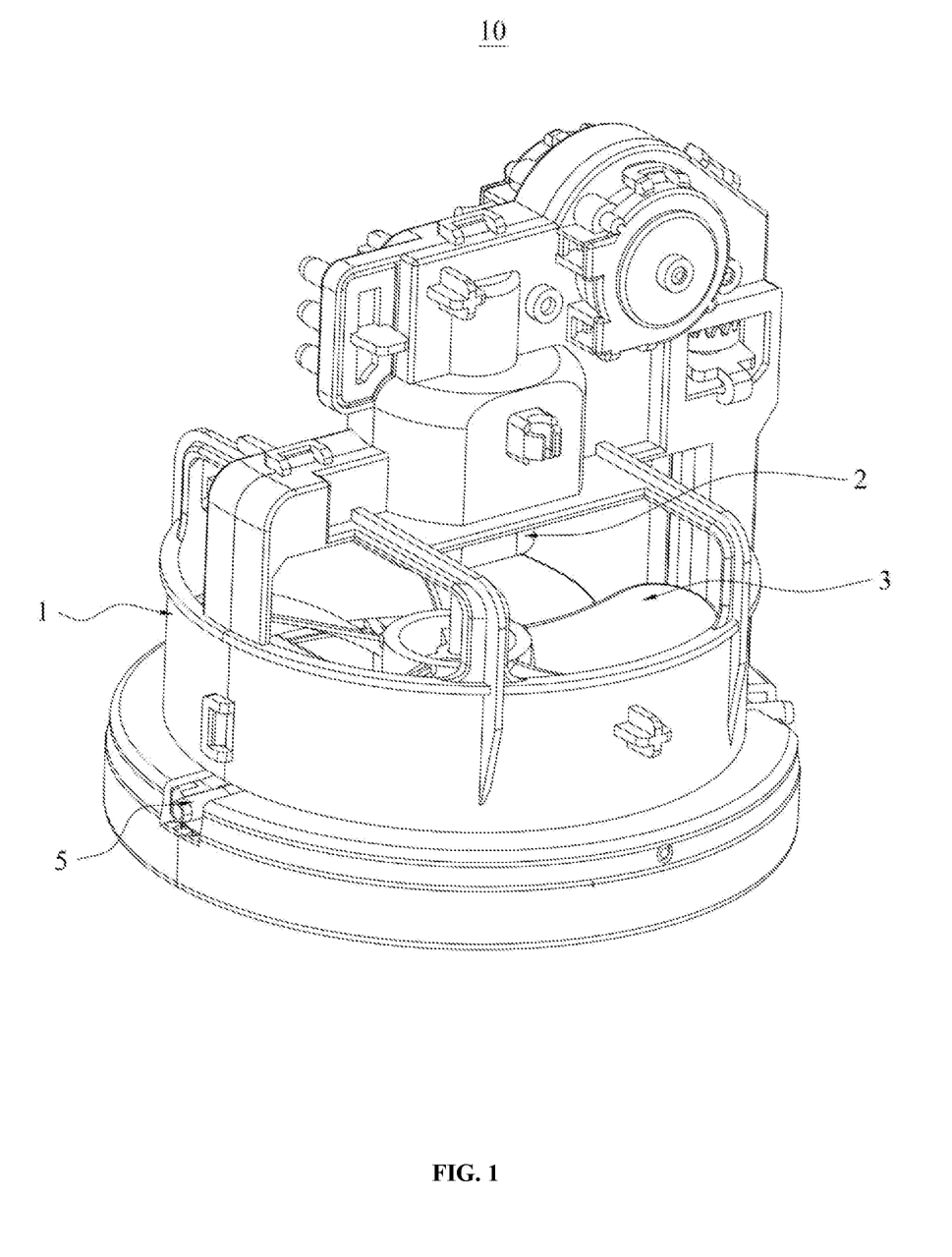
FIG. 1 is a schematic structural diagram of a foam machine in some embodiments of the present disclosure.
Figure 2:
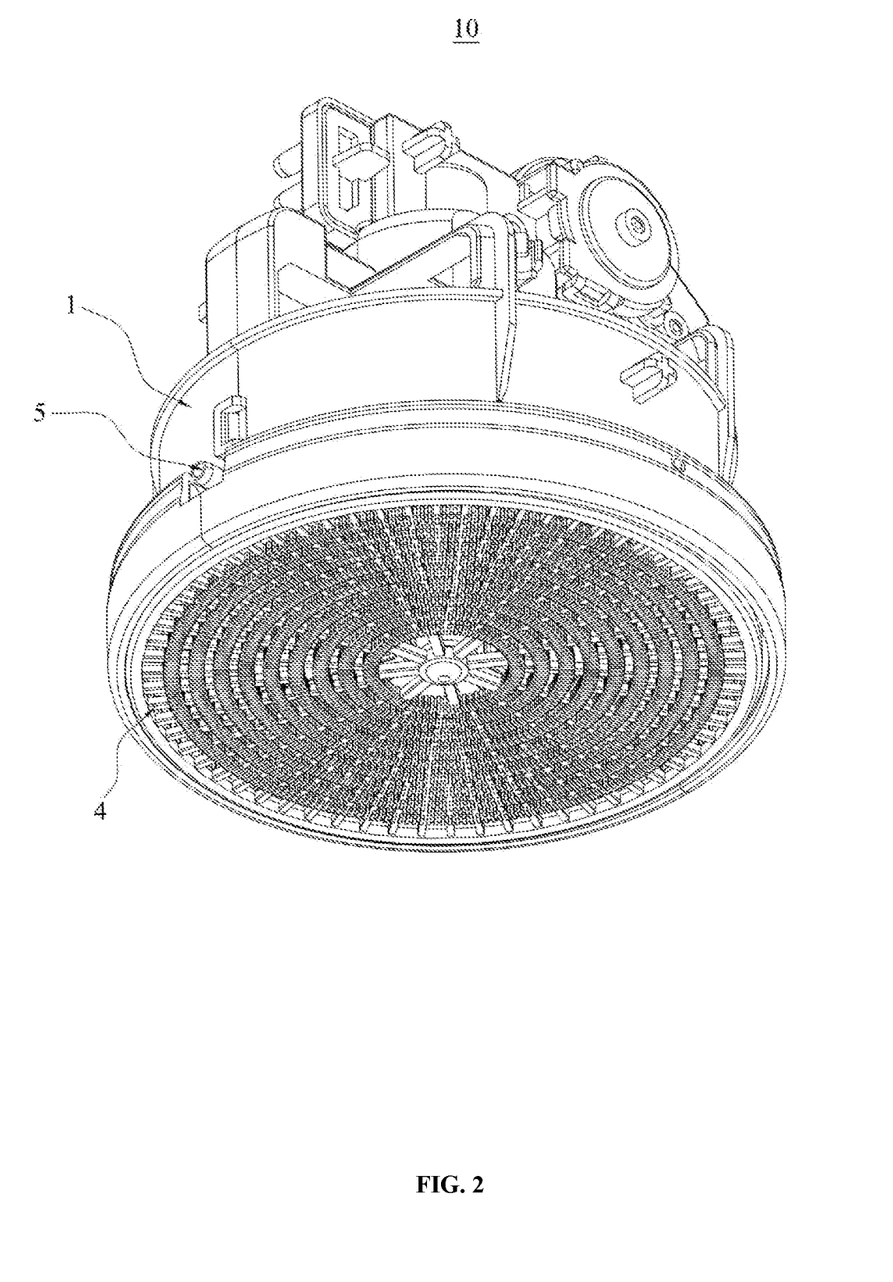
FIG. 2 is a schematic structural diagram of a foam machine shown in FIG. 1 in another angle.
Figure 3:
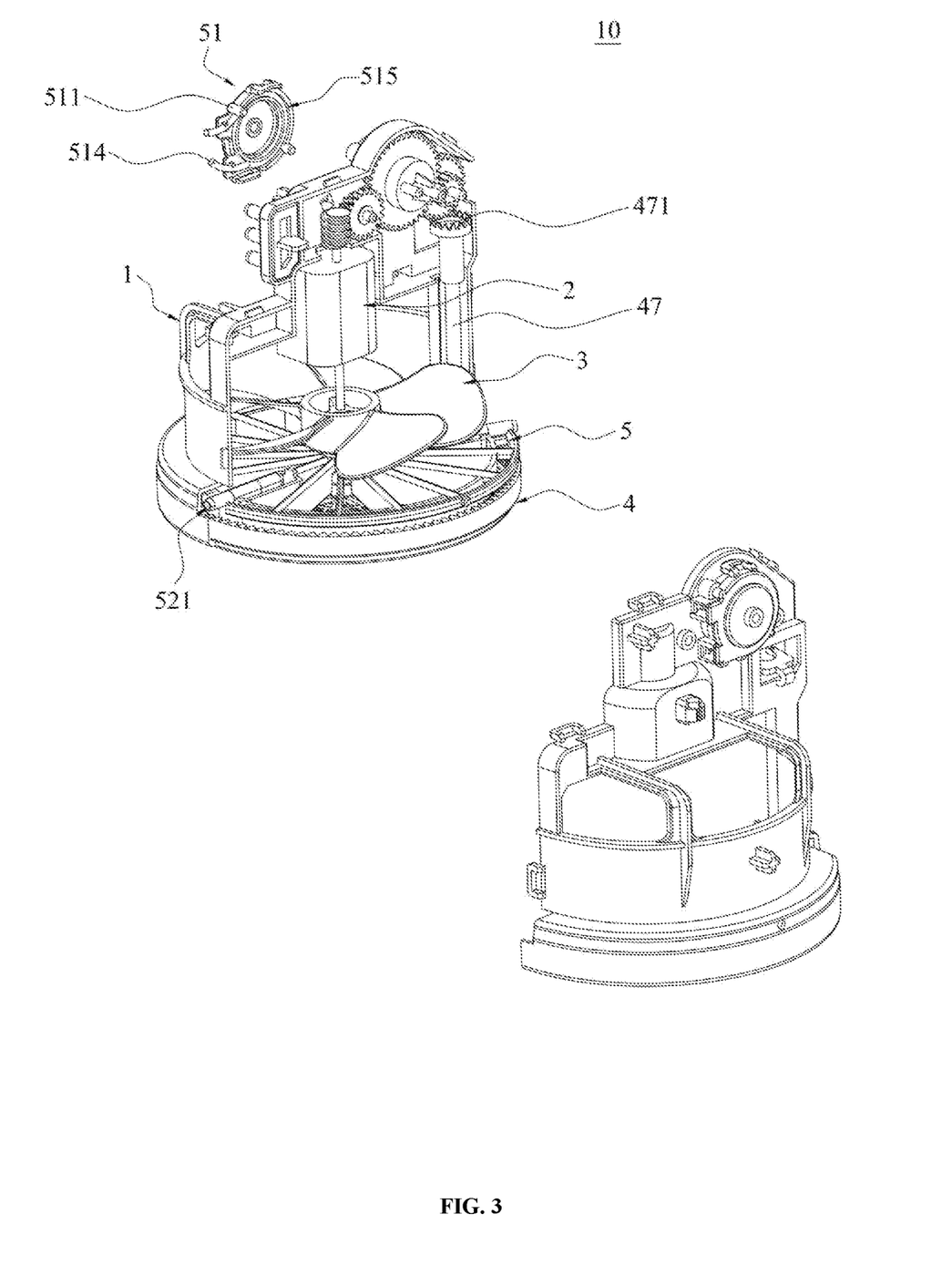
FIG. 3 is an exploded view (I) of a foam machine in some embodiments of the present disclosure.

FIG. 1 to FIG. 3 show a foam machine 10 in some embodiments of the present disclosure. The foam machine 10 is configured to form foams. The foam machine 10 includes a shell 1, a driving motor 2 arranged on the shell 1, fan blades 3 in driving connection to the driving motor 2, a foam forming device 4 movably arranged on the shell 1, and a laminating device 5 arranged on the shell 1.

It can be understood that the shell 1 achieves an effect of mounting and fixing other parts. The driving motor 2 is configured to output a torque to the fan blades 3. The fan blades 3 are configured to generate an air flow during rotation. The foam forming device 4 is configured to form foam films and form foams when the air flow passes through the foam films. The laminating device 5 is configured to continuously form foam films on the foam forming device 4.

As shown in FIG. 3 to FIG. 8, the foam forming device 4 includes a rotating ring 41 arranged on the shell 1, a number of forming rings 42 arranged on the rotating ring 41, and a number of forming ribs 43 arranged on the rotating ring 41. Centers of the forming rings 42 correspond to a center of the rotating ring 41, and radiuses of the forming rings 42 gradually increase (referring to FIG. 7 and FIG. 8). The forming ribs 43 are intersected with the forming rings 42, so that the forming ribs 43 and the forming rings 42 jointly define a number of foam film forming holes 44 on the rotating ring 41.

It can be understood that the rotating ring 41 is configured to drive the forming rings 42 and the forming ribs 43 to rotate, and the forming rings 42 and the forming ribs 43 can form the foam film forming holes 44 on the rotating ring 41. The centers of the plurality of forming rings 42 overlap with each other, and each foam film forming hole 44 is defined by two adjacent forming rings 42 and two adjacent forming ribs 43.

It should be noted that the foam film forming holes 44 are formed after the plurality of forming ribs 43 and the plurality of forming rings 42 are intersected. The foam film forming holes 44 are smaller in size, and a distance between two adjacent foam film forming holes 44 is very short. Continuous foams are formed after the foam films deform and are blown out.

Figure 4:
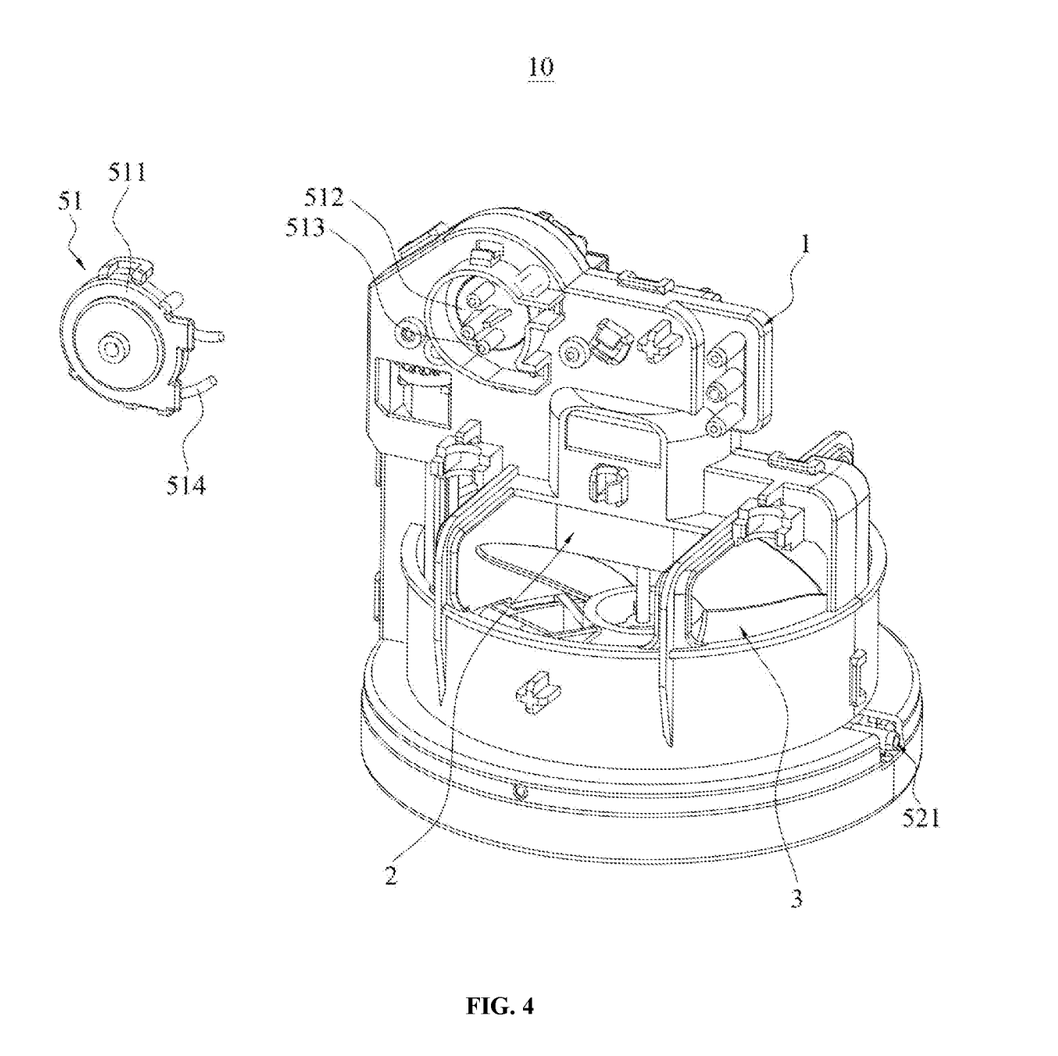
FIG. 4 is an exploded view (II) of a foam machine in some embodiments of the present disclosure.

As shown in FIG. 3 and FIG. 4, the laminating device 5 includes a liquid pump 51 arranged on the shell 1, and a laminating member 52 arranged on the shell 1. The laminating member 52 resists against the forming rings 42 and the forming ribs 43. The laminating member 52 is provided with a liquid inlet hole 521 communicated with the liquid pump 51 and a liquid outlet hole 522 facing to the foam forming device 4. The liquid inlet hole 521 is configured to introduce liquid, and the liquid inlet hole 521 is communicated with the liquid outlet hole 522.

Referring to FIG. 5 to FIG. 8, when the rotating ring 41 rotates, the liquid is exported through the liquid outlet hole 522 to the foam film forming holes 44, thereby forming foam films on the foam film forming holes 44. When the fan blades 3 rotate, an air flow is driven to pass through the foam film forming holes 44 to generate foams.

It can be understood that the liquid pump 51 is configured to pump the liquid for forming foams. The laminating member 52 is configured to form the foam films on the foam forming device 4, and the foam films can deform to form the foams when the air flow is blown through. The liquid inlet hole 521 is configured to transfer the liquid for forming foams to the liquid outlet hole 522. The laminating member 52 always maintains a resisting state against the forming rings 42 and the forming ribs 43.

It should be noted that the liquid pump 51 can be configured to be driven by the driving motor 2, and the rotating ring 41 can be configured to be driven by the driving motor 2. Specifically, a gear transmission mechanism can be configured on an output shaft of the driving motor 2. The gear transmission mechanism includes a number of gears engaged with each other, and the liquid pump 51 and the rotating ring 41 can be simultaneously driven through the gear transmission mechanism.

It should also be noted that in the rotation process of the rotating ring 41, the liquid may continuously be conveyed onto the forming rings 42 and the forming ribs 43, thereby continuously attaching the liquid to the foam film forming holes 44 and forming the foam films on the foam film forming holes 44. The foam films will deform into bubbles when the air flow passes through the foam film forming holes 44. In this case, due to a small space between two adjacent foam film forming holes 44, a large quantity of the foam film forming holes 44, and centralized arrangement of the foam film forming holes 44, a plurality of bubbles will be adhered to each other after being formed, thus forming the foams.

Specifically, the liquid pump 51 can be configured as various pump components, pump devices, pump mechanisms, or the like, which can pump liquid in the related art.

Further, the quantity of the forming rings 42 and the quantity of the forming ribs 43 can be flexibly set.

Figure 7:
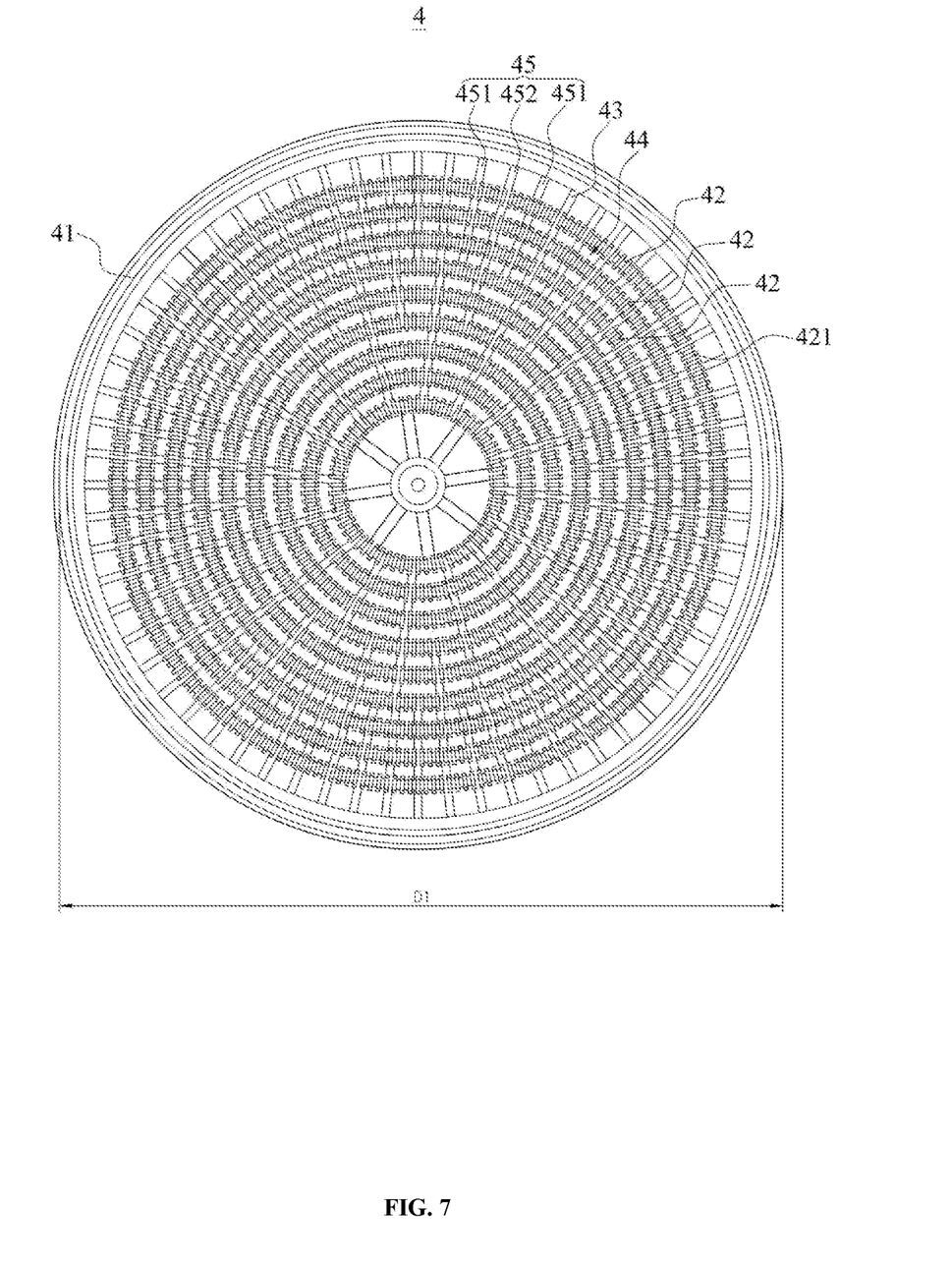
FIG. 7 is a schematic structural diagram of a foam forming device shown in FIG. 6 in another angle.
Figure 8:
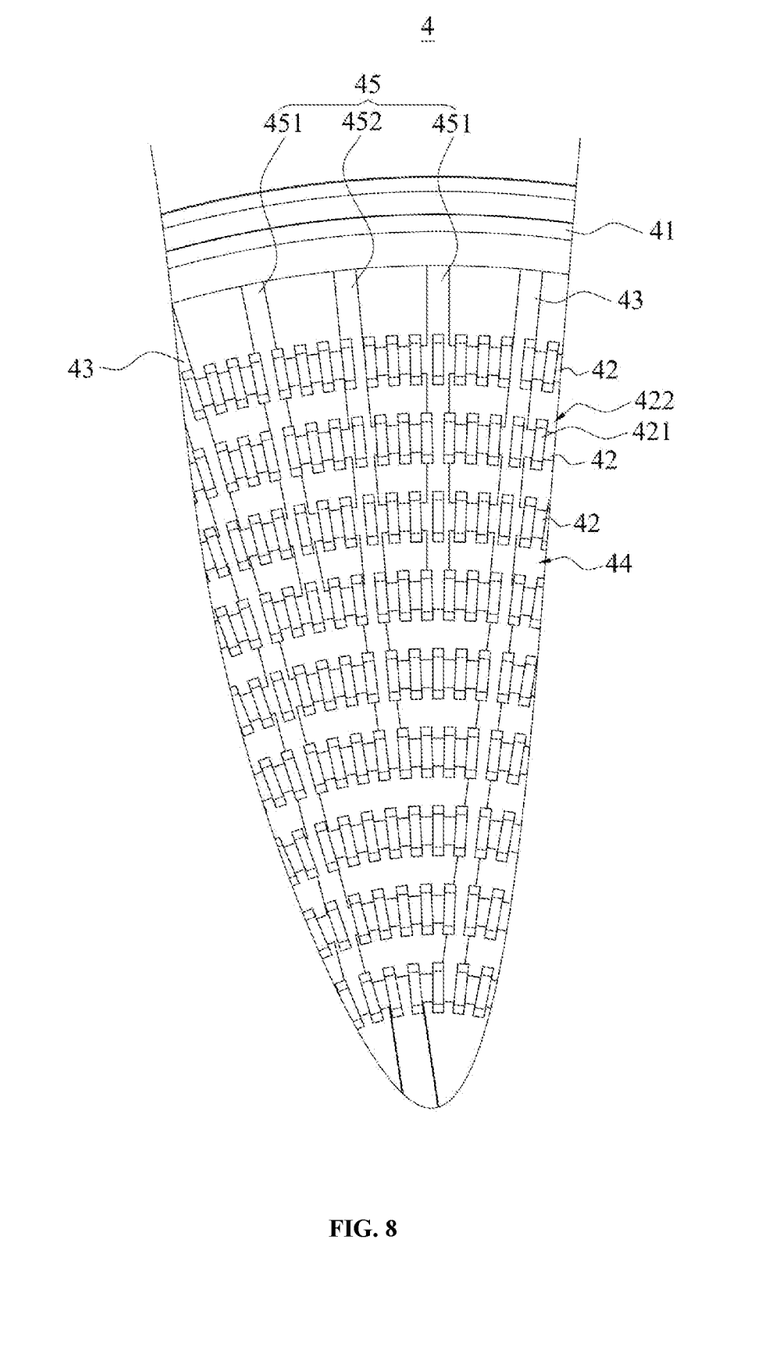
FIG. 8 is a partially structural diagram of a foam forming device shown in FIG. 6.

As shown in FIG. 7 and FIG. 8, in some embodiments of the foam machine 10, the forming rings 42 are each provided with a number of auxiliary rings 421. The auxiliary rings 421 are all exposed in the foam film forming holes 44. A liquid storage gap 422 is defined between two adjacent auxiliary rings 421.

It can be understood that the auxiliary rings 421 are used to assist in the formation of the foam films. The liquid storage gaps 422 are configured to store a certain amount of liquid for forming foam films, that is, the liquid for forming foams.

It should be noted that after the liquid flows into the foam film forming holes 44, a part of the liquid will directly form the foam films, while a part of the liquid will flow into the liquid storage gaps 422. In this way, on the one hand, the foam films can be maintained due to the liquid in the liquid storage gaps 422, and on the other hand, the arrangement of the auxiliary rings 421 also shortens a space between hole walls on two sides of the foam film forming holes 44, which is more conducive to the formation of the foam films, avoiding edges of the foam films from cracking at the hole walls of the foam film forming holes 4.

Specifically, an outer diameter D1 of the rotating ring 41 ranges from 65 mm to 95 mm.

Specifically, the foam forming device 4 includes at least eight forming rings 42.

It can be understood that due to the arrangement of the eight forming rings 42, the position concentration of the foam film forming holes 44 can be improved, and sizes of the foam film forming holes 44 can also be reduced, which is more conducive to the formation of the foams. Of course, the quantity of the forming rings 42 can also be configured to be nine, ten, eleven, twelve, thirteen, fourteen, fifteen, or larger.

Specifically, the foam forming device 4 includes at least fourteen forming ribs 43, and the forming ribs 43 are circumferentially distributed around the center of the rotating ring 41.

It can be understood that the quantity of the forming ribs 43 is configured to be fourteen, which can further reduce the sizes of the foam film forming holes 44. Arranging the forming ribs 43 around the center of the rotating ring 41 in a circumferential distribution manner can configure the sizes of the foam film forming holes 44 to be symmetrical with each other, so as to avoid the foam film forming holes 44 at some positions from having an extremely large or small hole diameter, and also ensure that the foams are maintained as uniform as possible as a whole after being formed on the foam forming device 4, so as to avoid partial foams from being too sparse or too dense.

Figure 6:
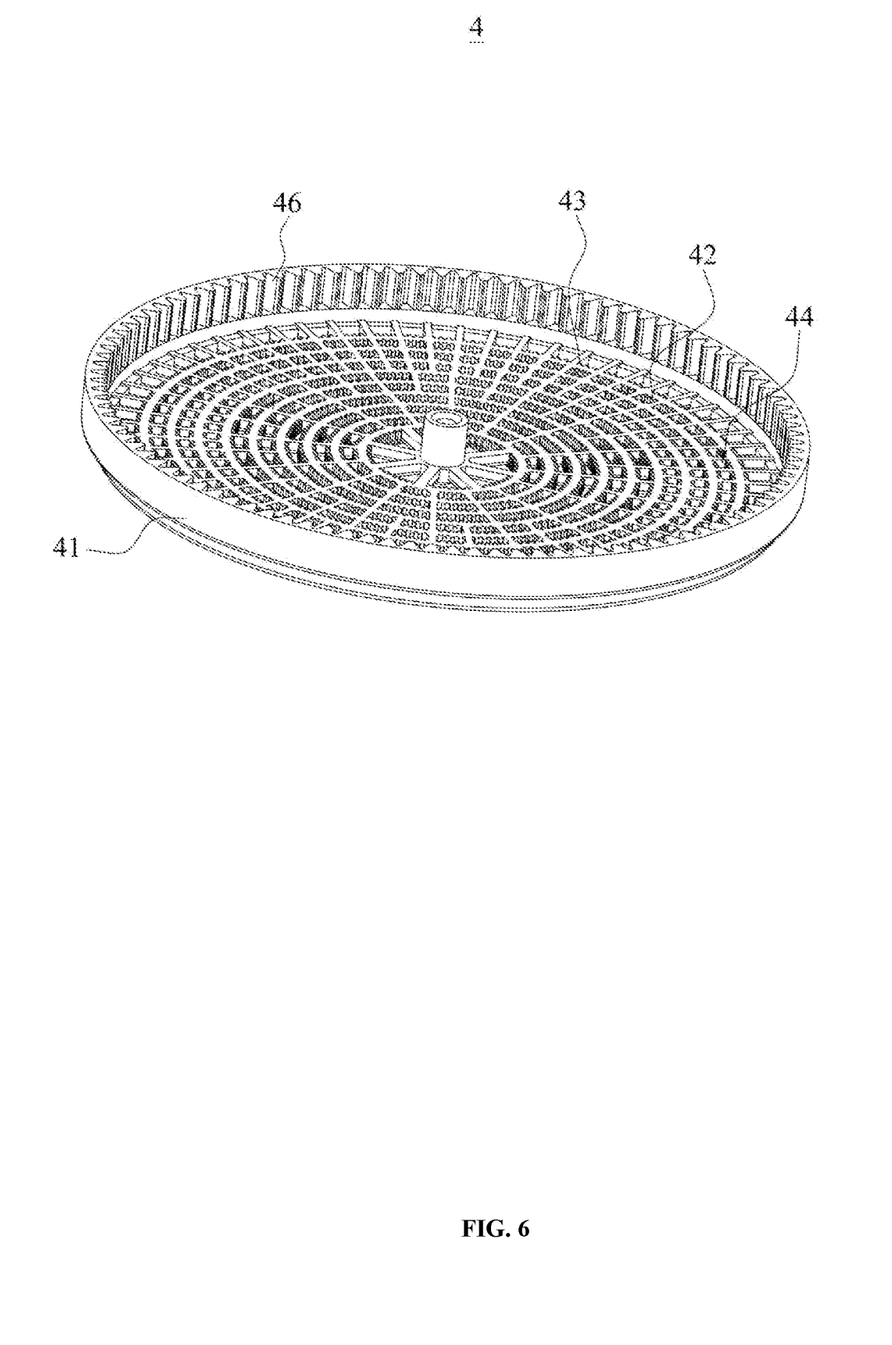
FIG. 6 is a schematic structural diagram of a foam forming device in some embodiments of the present disclosure.

As shown in FIG. 6 to FIG. 8, in some embodiments of the foam machine 10, the centers of the forming rings 42 overlap each other, and a space between any two adjacent forming rings 42 is equal in size.

It can be understood that according to this embodiment, the forming rings 42 can be uniformly arranged to further improve the overall uniformity of the foams after being formed.

As shown in FIG. 7 and FIG. 8, in some embodiments of the foam machine 10, the foam forming device 4 further includes a number of spacing groups 45. One spacing group 45 is arranged between every two adjacent forming ribs 43, and each spacing group 45 includes two first ribs 451 spaced part from each other and a second rib 452 located between the two first ribs 451. The first ribs 451, the second ribs 452, the forming ribs 43, and the forming rings 42 jointly define the several foam film forming holes 44 on the rotating ring 41.

It can be understood that due to the arrangement of the spacing groups 45, more foam film forming holes 44 can be further defined, and the hole diameters of the foam film forming holes 44 are made to be smaller, which is more conducive to the formation of the foams. A length of each second rib 452 is greater than a length of each first rib 451.

Due to the denser and smaller foam film forming holes 44, the sizes of the bubbles on the foams are smaller, and finer foams are formed.

Figure 5:
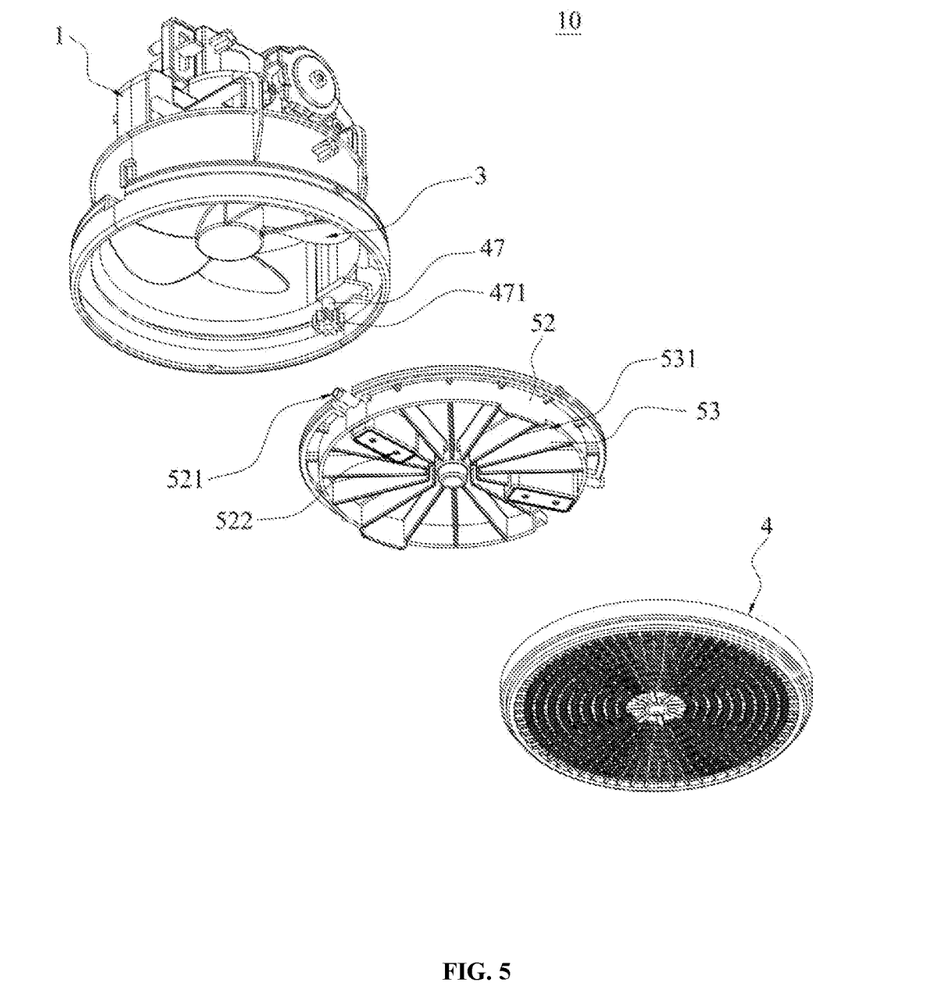
FIG. 5 is an exploded view (III) of a foam machine in some embodiments of the present disclosure.

As shown in FIG. 5, in some embodiments of the foam machine 10, the laminating device 5 further includes a number of flow distribution plates 53 arranged on the laminating member 52. An air guide channel 531 is defined between any two adjacent flow distribution plates 53. The air guide channel 531 is configured to guide the air flow to be blown to the foam forming device 4.

It can be understood that the flow distribution plates 53 are configured to distribute air, so that the air flow generated by the fan blades 3 flows uniformly. The air guide channels 531 correspondingly guide the air flow to the forming rings 42 and the forming ribs 43 at different positions, so that the foam film forming holes 44 can form bubbles, which avoids the lack of air flow at partial positions and further ensures the forming uniformity of the foams.

As shown in FIG. 3 to FIG. 5, in some embodiments of the foam machine 10, preferably, the laminating member 52 is provided with a number of the liquid inlet holes 521 and a number of the liquid outlet holes 522. The liquid inlet holes 521 are all communicated with at least two of the liquid outlet holes 522.

The laminating member 52 is provided with two liquid inlet holes 521 and four liquid outlet holes 522. The liquid inlet holes 521 are all communicated with the two liquid outlet holes 522.

As shown in FIG. 6, in some embodiments of the foam machine 10, the foam forming device 4 further includes a tooth ring 46 arranged on the rotating ring 41 and a transmission rod 47 arranged on the shell 1. Two ends of the transmission rod 47 are provided with gears 471. One end of the transmission rod 47 is engaged with the tooth ring 46, and the other end of the transmission rod 47 is engaged with the driving motor 2.

It can be understood that the tooth ring 46 can be configured to be arranged on an inner ring or the outer ring of the rotating ring 41. The gears 471 on the transmission rod 47 can be configured to be connected to the driving motor 2 through other gears, so that the driving motor 2 can drive the transmission rod 47 to rotate through the gears 471. Thus, the transmission rod 47 can then drive the tooth ring 46 to rotate through the gear 471 at the other end, and the tooth ring 46 drives the rotating ring 41 to rotate.

It should be noted that the tooth ring 46 can be configured to be integrally formed and arranged on the rotating ring 41.

As shown in FIG. 3 and FIG. 4, in some embodiments of the foam machine 10, the liquid pump 51 includes a pump case 511 arranged on the shell 1, a rotating disk 512 in driving connection to the driving motor 2, a convex column 513 arranged on the rotating disk 512, and an infusion tube 514 arranged in the pump case 511.

The pump case 511 defines an infusion channel 515 on the shell 1. The infusion tube 514 is located inside the infusion channel 515. The infusion tube 514 is communicated with the liquid inlet holes 521. The convex column 513 resists against the infusion tube 514 in a sliding manner. The rotating disk 512 drives the convex column 513 to move along the infusion channel 515, so that the infusion tube 514 guides the liquid to the liquid inlet holes 521.

It can be understood that the pump case 511 plays a role of accommodating and protecting other parts. The rotating disk 512 can be in driving connection to the driving motor 2 through the several gears engaged with each other. When driven by the rotating disk 512, the convex column 513 may continuously move along the infusion channel 515. Furthermore, the convex column 513 may always resist against the infusion tube 514 during the movement, so that the liquid in the infusion tube 514 may be continuously pumped to the foam forming device 4 under the pushing of the convex column 513.

Implementation of the present disclosure has the following beneficial effects:

The present disclosure relates to a foam machine. Liquid for generating foams is conveyed onto a laminating member through a liquid pump. The laminating member further conveys the liquid onto a foam forming device. On the foam forming device, a rotating ring is provided with a plurality of forming rings and a plurality of forming ribs, so that a plurality of foam film forming holes are formed in the rotating ring; afterwards, as the rotating ring rotates, the laminating member can form foam films on the foam film forming holes, and continuous foams are formed after an air flow is blown through; the foams are pushed by the air flow to be continuously sprayed out; and new foam films are continuously formed on the foam film forming holes.

Therefore, the arrangement of a mixing chamber and an air pump injection mechanism is avoided, which improves the overall compactness of a product and also reduces the production cost of the product.

The solutions of the present disclosure have been described in detail above with reference to the accompanying drawings. In the above-mentioned embodiments, the descriptions of all the embodiments have their own focuses. For parts that are not described in detail in an embodiment, reference may be made to related descriptions of other embodiments. Those skilled in the art should also be aware that the actions and modules involved in the specification are not necessarily necessary for the present disclosure. In addition, it can be understood that the steps in the method embodiments of the present disclosure can be adjusted, combined and deleted according to actual needs, and the modules in the device embodiments of the present disclosure can be combined, divided and deleted according to actual needs.

The embodiments of the present disclosure have been described above. The above description is exemplary, not exhaustive, and are not limited to the disclosed embodiments. Without departing from the scope and spirit of all the described embodiments, many modifications and changes are obvious to those of ordinary skill in the art. The selection of terms used herein aims to best explain the principles of all the embodiments, practical applications or improvement of technologies in the market, or to enable other persons of ordinary skill in the art to understand the embodiments disclosed herein.

What is claimed is:

1. A foam machine, comprising a shell, a driving motor arranged on the shell, fan blades in driving connection to the driving motor, a foam forming device arranged on the shell, and a laminating device arranged on the shell,
    wherein the foam forming device comprises a rotating ring rotatably arranged on the shell, a number of forming rings arranged on the rotating ring, and a number of forming ribs arranged on the rotating ring; wherein the driving motor is configured to drive the rotating ring and the fan blades to rotate with respect to the shell; the forming rings are concentric with the rotating ring, and the forming rings are arranged spaced apart in a radial direction of the rotating ring; each forming rib is intersected with all of the forming rings, so that the forming ribs and the forming rings cooperate together to define a number of foam film forming holes on the rotating ring;
    the laminating device comprises a liquid pump arranged on the shell, and a laminating member arranged on the shell; the laminating member is configured to resist against the forming rings and the forming ribs; the laminating member is provided with a liquid inlet hole communicated with the liquid pump and a liquid outlet hole facing to the foam forming device;
    the liquid inlet hole is configured to introduce liquid; the liquid inlet hole is communicated with the liquid outlet hole;
    when the rotating ring rotates, the liquid is exported through the liquid outlet hole to the foam film forming holes, thereby forming foam films on the foam film forming holes; and when the fan blades rotate, an air flow is driven to pass through the foam film forming holes to generate foam.

2. The foam machine according to claim 1, wherein the forming rings are each provided with a number of auxiliary rings; the auxiliary rings are all exposed in the foam film forming holes; and a liquid storage gap is defined between two adjacent auxiliary rings.

3. The foam machine according to claim 1, wherein an outer diameter of the rotating ring is 65 mm to 95 mm; and/or
the foam forming device comprises at least eight forming rings; and/or
the foam forming device comprises at least fourteen forming ribs, and the forming ribs are circumferentially distributed around the center of the rotating ring.

4. The foam machine according to claim 1, wherein the forming rings are arranged equally spaced within the rotating ring.

5. The foam machine according to claim 1, wherein the foam forming device further comprises a number of spacing groups each of which is arranged between every two adjacent forming ribs, and each spacing group comprises two first ribs spaced part from each other and a second rib located between the two first ribs; and the first ribs, the second ribs, the forming ribs, and the forming rings jointly define several foam film forming holes on the rotating ring.

6. The foam machine according to claim 1, wherein the laminating device further comprises a number of flow distribution plates arranged on the laminating member; an air guide channel is arranged between any two adjacent flow distribution plates; and the air guide channels guide the air flow to be blown to the laminating member.

7. The foam machine according to claim 1, wherein the laminating member is provided with a number of liquid inlet holes and a number of liquid outlet hole groups corresponding to the liquid inlet holes one by one; wherein each liquid outlet hole group comprises at least two of the liquid outlet holes; each liquid inlet hole communicates with all of the liquid outlet holes of its corresponding liquid inlet hole group.

8. The foam machine according to claim 7, wherein the laminating member is provided with two liquid inlet holes and two liquid outlet hole groups; wherein each liquid outlet hole group comprises two liquid outlet holes.

9. The foam machine according to claim 1, wherein the foam forming device further comprises a tooth ring arranged on the rotating ring and a transmission rod arranged on the shell;
two ends of the transmission rod are provided with gears; one end of the transmission rod is engaged with the tooth ring; and an other end of the transmission rod is engaged with the driving motor.

10. The foam machine according to claim 1, wherein the liquid pump comprises a pump case arranged on the shell, a rotating disk in driving connection to the driving motor, a convex column arranged on the rotating disk, and an infusion tube arranged in the pump case;
the pump case defines an infusion channel on the shell; the infusion tube is located inside the infusion channel; the infusion tube is communicated with the liquid inlet hole;
the convex column resists against the infusion tube in a sliding manner; and the rotating disk drives the convex column to move along the infusion channel, so that the infusion tube guides the liquid to the liquid inlet holes.

* * * * *